Patented Nov. 14, 1922.

1,435,303

UNITED STATES PATENT OFFICE.

ARTHUR L. JENNINGS AND JOHN F. DOLAN, OF PERTH AMBOY, NEW JERSEY.

PROCESS FOR THE REMOVAL OF THE IMPURITIES FROM TIN ORE BEFORE THE ORE IS SMELTED.

No Drawing. Application filed December 14, 1921. Serial No. 522,329.

*To all whom it may concern:*

Be it known that we, ARTHUR L. JENNINGS and JOHN F. DOLAN, citizens of the United States, residing at Perth Amboy, in the county of Middlesex and State of New Jersey, have invented a certain new and useful Process for the Removal of the Impurities from Tin Ore Before the Ore is Smelted, of which the following is a full, clear, and exact description.

The object of this invention is to provide a simple process for the removal of the impurities from tin ore before the ore is smelted.

Tin is found in nature in the form of an oxide $SnO_2$ commonly called tin stone or cassiterite. The degree of purity of the mineral cassiterite varies widely, some localities yielding a reasonably pure tin oxide while in others the tin oxide as mined is very impure carrying with it varying amounts of copper, lead, antimony, arsenic, iron, sulfur, bismuth and silica. This is particularly true of the Bolivian deposits from which the tin smelters in this country draw their supply of ore.

The presence of sulfur and arsenic in the ore make it necessary to roast the ore so as to remove them before it can be smelted.

The presence of copper, lead, antimony and bismuth in the ore render the metallic tin produced impure, in some cases it being impossible to make metallic tin over 98—99% pure without refining the tin produced electrolytically to remove the impurities.

The tin oxide is reduced to metallic tin by heating the ore to a high temperature with carbon. By the present method it is during this smelting operation that the iron is removed, the iron being present in the ore as an oxide.

A sufficient quantity of silica and lime are added to the ore to unite with the iron oxide present to form a slag. The amount of silica and lime added being dependent upon the amount of iron oxide present that must be removed as slag so that none of the iron oxide is reduced to the metallic state during the smelting operation. It is therefore obvious that the higher the percentage of iron oxide present in the ore the larger the amount of slag will be that is formed and as the slag always carries some tin with it the larger the amount of slag formed the lower will be the percentage of tin recovered from the ore.

The object of the present invention is to provide a simple method for the removal of these impurities in tin ore before the ore is smelted whereby a pure metallic tin is obtained and the smelting losses are lower than those obtained by the methods now in use. This invention consists in removing the impurities from tin ore by fusing the ore with an alkali metal acid sulfate for instance, sodium bisulfate (niter cake which is a by product of the manufacture of nitric acid). The fused mass is then leached with water which dissolves all the impurities which have been converted into sulfates (with the exception of the silica) leaving the tin oxide unaffected.

We have found that ordinary tin oxide when fused with an alkali metal acid sulfate is converted into tin sulfate and is soluble in water but tin oxide as found in nature as tin stone or cassiterite when fused with an alkali metal acid sulfate and the fused mass dissolved in water the tin oxide is unaffected by the treatment and is insoluble. The impurities that are found in tin ore when fused with an alkali metal acid sulfate are converted into soluble sulfates and when the fused mass is leached with water they dissolve, with the exception of silica which is unattacked.

It is not necessary to roast the ore for the removal of sulfur which is now the common practice as the sulfur is converted into sodium thiosulfate by this process and is soluble in water.

After leaching the fused mass with water and the impurities are all dissolved the purified tin oxide is filtered out and washed several times with water to remove the last traces of the impurities. The purified tin oxide is then ready to be reduced to the metallic state.

By the use of this method pure tin can be produced from ores that are high in impurities without electrolytic refining.

By reason of the iron being removed from the ore before the ore is smelted to reduce the tin oxide to metalic tin the amount of slag formed will be very small thereby greatly reducing the amount of tin that would otherwise be carried off in the slag.

This makes it possible to successfully handle ores that are considered to be of a too low grade to be handled by the present methods.

Having thus described our invention what we claim as new and useful and of our own invention and what we desire to secure by Letters Patent is:

1. A method of removing the impurities from tin ore before the ore is smelted by fusing the tin ore with an alkali metal acid sulfate.

2. A method of removing the impurities from tin ore before the ore is smelted by fusing the tin ore with an alkali metal acid sulfate, and leaching the fused mass so obtained with water.

In testimony whereof we have hereunto affixed our signatures this 1st day of November, 1921.

ARTHUR L. JENNINGS.
JOHN F. DOLAN.